(12) United States Patent
Lee et al.

(10) Patent No.: US 7,580,251 B2
(45) Date of Patent: Aug. 25, 2009

(54) ELECTRONIC EQUIPMENT WITH INDEPENDENT POWER SUPPLY UNIT

(75) Inventors: Justin Si-Shung Lee, Walnut Creek, CA (US); Hung-Feng Tai, Hsinchu County (TW); Szu-Cheng Wen, Hsinchu County (TW)

(73) Assignee: Accton Technology Corporation, Hsinchu (TW)

( * ) Notice: Subject to any disclaimer, the term of this patent is extended or adjusted under 35 U.S.C. 154(b) by 293 days.

(21) Appl. No.: 11/558,463

(22) Filed: Nov. 10, 2006

(65) Prior Publication Data

US 2008/0049401 A1    Feb. 28, 2008

(30) Foreign Application Priority Data

Aug. 28, 2006    (TW) .............................. 95131532 A

(51) Int. Cl.
*G06F 1/16*    (2006.01)

(52) U.S. Cl. .................. 361/679.28; 455/566; 347/102; 345/179

(58) Field of Classification Search ................. 700/214, 700/218; 370/338; 361/679–687, 724–727; 345/179, 173; 347/42, 50, 85, 102; 455/566
See application file for complete search history.

(56) References Cited

U.S. PATENT DOCUMENTS

| 2004/0057196 A1* | 3/2004 | Yang ........................... 361/683 |
| 2005/0015179 A1* | 1/2005 | Dickey et al. ............... 700/214 |
| 2007/0291716 A1* | 12/2007 | Morales Barroso ......... 370/338 |

* cited by examiner

*Primary Examiner*—Hung V Duong
(74) *Attorney, Agent, or Firm*—Jianq Chyun IP Office

(57) ABSTRACT

An electronic equipment including an electronic device, a power supply unit and a supporting structure is provided. The electronic device includes a casing. The power supply unit is physically independent to the electronic device and electrically connects with the electronic device to supply power to the electronic device. The supporting structure is assembled to the electronic device and supports the power supply unit.

8 Claims, 5 Drawing Sheets

ELECTRONIC EQUIPMENT WITH INDEPENDENT POWER SUPPLY UNIT

CROSS-REFERENCE TO RELATED APPLICATION

This application claims the priority benefit of Taiwan application Ser. No. 95131532, filed Aug. 28, 2006. All disclosure of the Taiwan application is incorporated herein by reference.

BACKGROUND OF THE INVENTION

1. Field of the Invention

The present invention relates to an electronic equipment, and more particularly, to an electronic equipment with a power supply unit physically independent to an electronic device.

2. Description of Related Art

In recent years, the rapid development of the World Wide Web has led to a significant increase in network communication services so that data transmission between computers is no longer limited by distance, and human's dependence on network equipment is increasing every day.

The transmission of data through the World Wide Web requires a number of electronic devices. The required electronic equipment for data transmission includes modems, access points (AP), hubs and switches. In general, these electronic devices have a power supply unit integrated inside thereof for generating or converting external electrical power and providing the power to the aforementioned electronic devices. However, these electronic devices generally have the following disadvantages:

1. When the power supply unit is damaged, it is difficult for the users to replace the power supply unit on their own, so the users may have to buy a brand new electronic device.

2. Because the electronic device only accepts a power supply unit with specific specifications, the users' options for selecting the power supply unit are severely limited.

3. For those electronic devices requiring a larger supply of electrical power, a larger power supply unit must be installed. Therefore, the volume of the electronic device will be substantially increased. In other words, the space required to accommodate the electronic device must be increased.

SUMMARY OF THE INVENTION

Accordingly, at least one objective of the present invention is to provide an electronic equipment that facilitates users to replace a power supply unit on their own.

At least another objective of the present invention is to provide an electronic equipment for broadening the selection of its power supply units.

At least yet another objective of the present invention is to provide an electronic equipment for reducing the volume of its electronic device.

To achieve these and other advantages and in accordance with the purpose of the invention, as embodied and broadly described herein, the invention provides an electronic equipment. The electronic equipment includes an electronic device, a power supply unit and a supporting structure. The electronic device includes a casing. The power supply unit is physically independent to the electronic device and electrically connects with the electronic device to supply power to the electronic device. The supporting structure is assembled to the electronic device and supports the power supply unit.

In one embodiment of the present invention, the foregoing electronic device and the power supply unit are arranged in parallel next to each other.

In one embodiment of the present invention, at least a first embedded-joint portion and at least a second embedded-joint portion are formed on the casing of the foregoing electronic equipment and the supporting structure respectively. The first embedded-joint portion and the second embedded-joint portion are joined together so that the casing supports the supporting structure on one side of the casing.

In one embodiment of the present invention, the first embedded-joint portion is a slot and the second embedded-joint portion is a bolt corresponding to the slot.

In one embodiment of the present invention, the foregoing electronic device overlaps with the power supply unit.

In one embodiment of the present invention, the foregoing electronic equipment further includes a cabinet. The electronic device and the supporting structure are assembled to the cabinet so that the supporting structure is assembled to the electronic device through assembling the supporting structure to the cabinet.

In one embodiment of the present invention, the foregoing power supply unit is detachably assembled to the supporting structure.

In one embodiment of the present invention, the foregoing electronic device is an Ethernet switch.

The electronic equipment in the present invention facilitates the users to install or remove the power supply unit. In addition, because the power supply unit is physically independent to the electronic device, the volume of the electronic device is reduced. Hence, more options are available for selecting the position of installation of the electronic device It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1A:
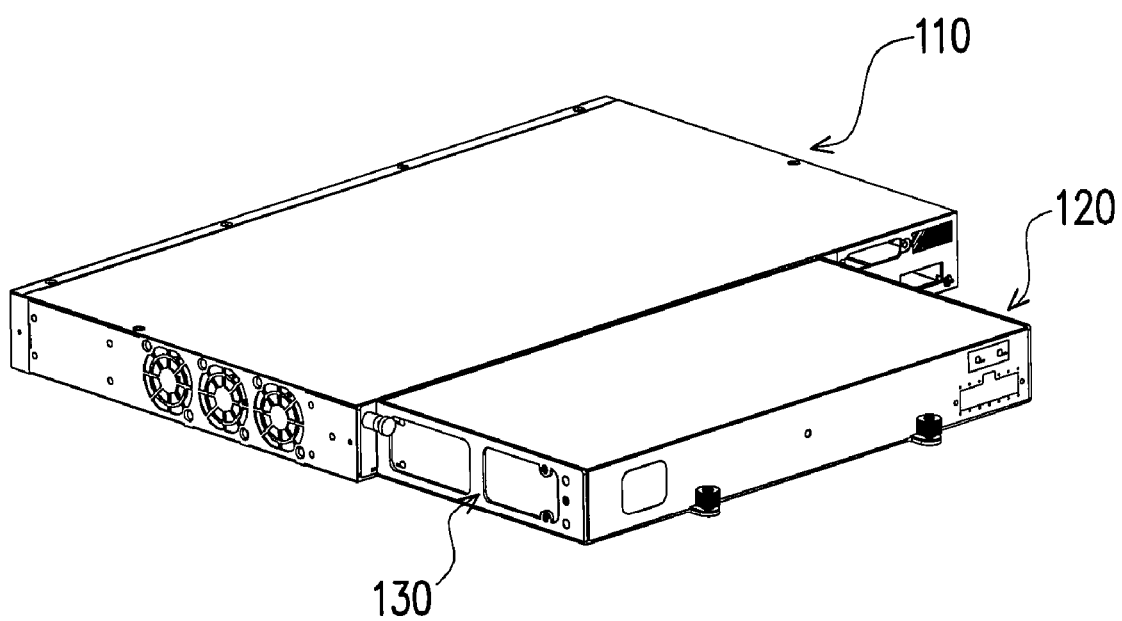
FIG. 1A is a perspective view of an electronic equipment according to a first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

To remove the disadvantages of the conventional technique and improve the foregoing electronic device, the present invention provides an electronic equipment that includes an electronic device and a power supply unit. The power supply unit is physically independent to the electronic device. In addition, the electronic equipment further includes a supporting structure for supporting the power supply unit. Hence, not only are the drawbacks of the conventional technique eliminated, but the assembling of the electronic device also has more possibilities. For example, it is much easier to install the electronic device inside an existing cabinet. In the following, two embodiments are used to provide a detailed explanation of the electronic equipment in the present invention.

First Embodiment

Figure 1B:
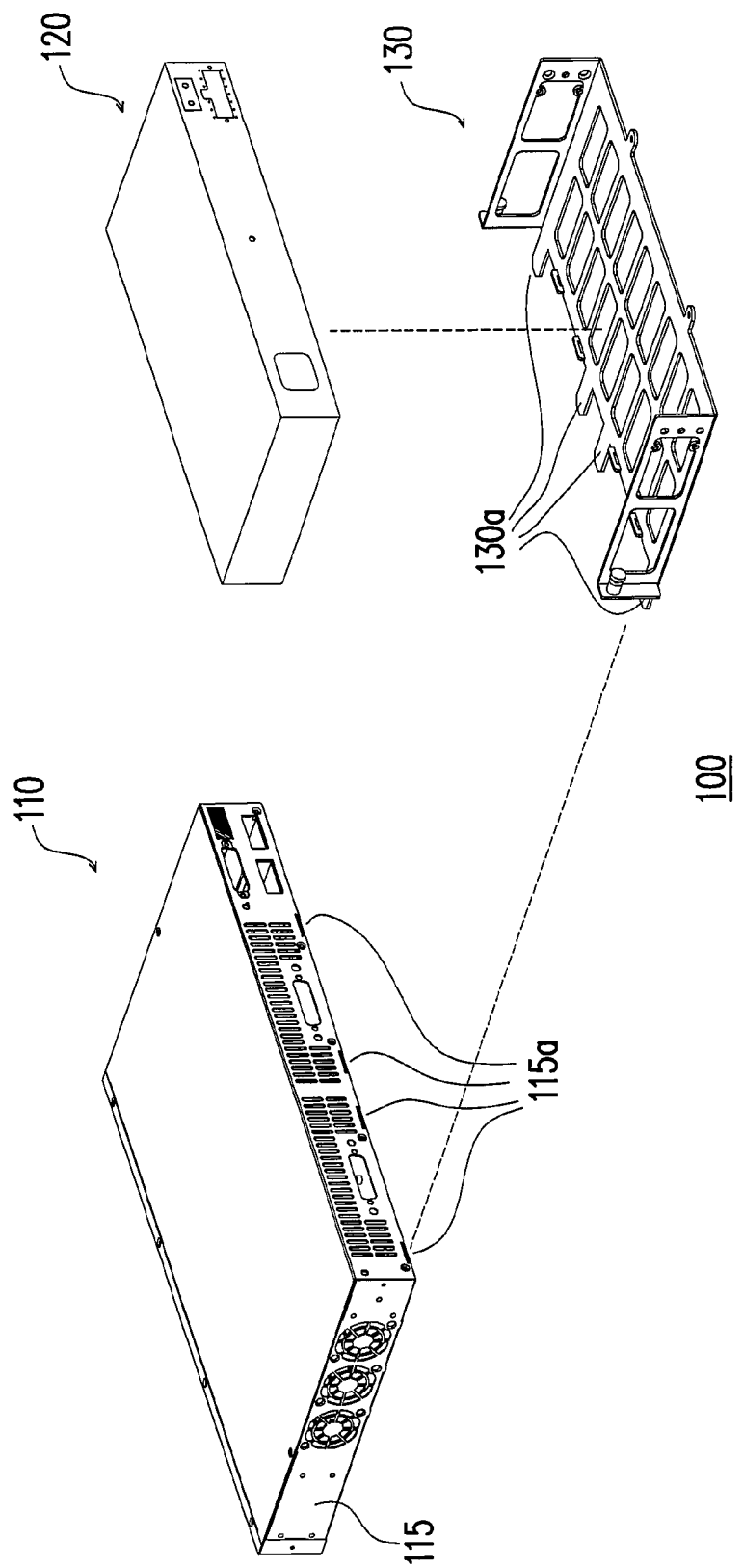
FIG. 1B is a perspective view of the dissociated components of the electronic equipment shown in FIG. 1A.

FIG. 1A is a perspective view of an electronic equipment according to a first embodiment of the present invention. FIG. 1B is a perspective view of the dissociated components of the electronic equipment shown in FIG. 1A. As shown in FIGS. 1A and 1B, the electronic equipment 100 in the present invention includes an electronic device 110, a power supply unit 120 and a supporting structure 130. The electronic device 110 is, for example, an Ethernet switch or a broadband access equipment. The electronic device 110 has a casing 115. The power supply unit 120 is physically independent to the electronic device 110 and electrically connects to the electronic device 110 to provide power to the electronic device 110.

The foregoing power supply unit 120 and the electronic device 110 are, for example, electrically connected through a set of corresponding connectors (not shown). The power supply unit 120 is physically independent to the electronic device 110. In other words, the electronic device 110 and the power supply unit 120 are two physically independent modules. Therefore, the volume of the electronic device 120 is significantly reduced. Furthermore, users can easily replace the power supply unit 120 on their own and there is no need to open the casing of the electronic device 110 for the replacement.

The supporting structure 130 is assembled to the electronic device 100 and used to support the power supply unit 120. The power supply unit 120 may be detachably assembled to the supporting structure 130. For example, the power supply unit 120 and the supporting structure 130 are locked together using a set of screws. Furthermore, the supporting structure 130 is not limited to the shapes shown in FIGS. 1A and 1B. Preferably, the supporting structure 130 is designed to be capable of supporting a power supply unit of various shapes and dimensions. In the first embodiment shown in FIG. 1A, the electronic device 110 and the power supply unit 120 are arranged in parallel next to each other through the supporting structure 130.

Figure 1C:
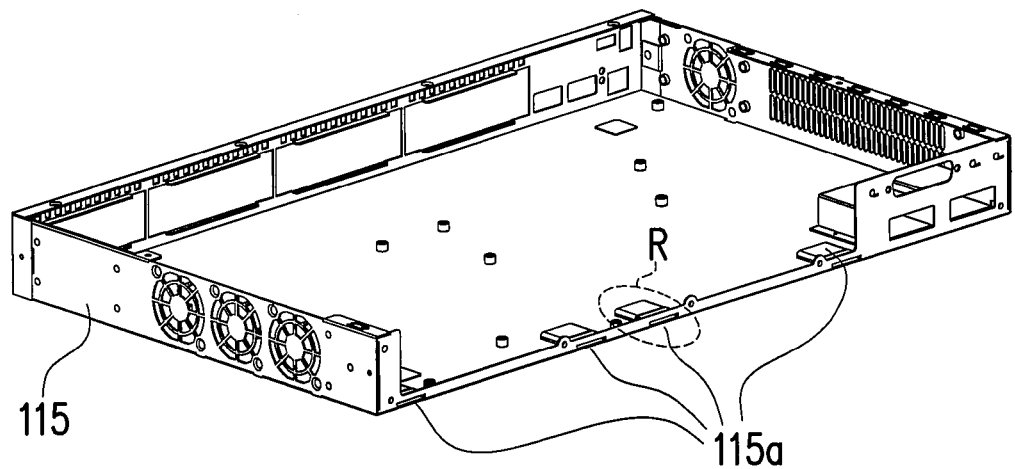
FIG. 1C is a perspective view of a portion of the casing of the electronic equipment shown in FIG. 1A.
Figure 1D:
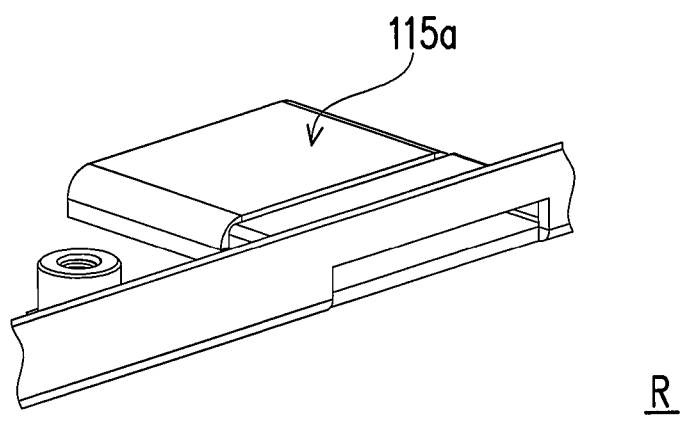
FIG. 1D is a magnified view of the area R labeled in FIG. 1C.

FIG. 1C is a perspective view of a portion of the casing of the electronic equipment shown in FIG. 1A. FIG. 1D is a magnified view of the area R labeled in FIG. 1C. As shown in FIGS. 1B through 1D, at least a first embedded-joint portion 115a and at least a second embedded-joint portion 130a are formed on the casing 115 of the electronic equipment 100 and the supporting structure 130 respectively. The second embedded-joint portions 130a and the first embedded-joint portions 115a are respectively engaged to each other so that the casing 115 supports the supporting structure 130 on one side of the casing 115 or on some other location.

As shown in FIG. 1B, the first embedded-joint portion 115a can be a slot and the second embedded-joint portion 130a can be a bolt that corresponds to the slot. In addition, as shown in FIGS. 1C and 1D, the first embedded-joint portion 115a in the first embodiment is formed in a punch-forming process of the casing 115. In other words, the first embedded-joint portion 115a is a part of the casing 115 before the first embedded-joint portion 115a is formed.

Second Embodiment

Figure 2A:
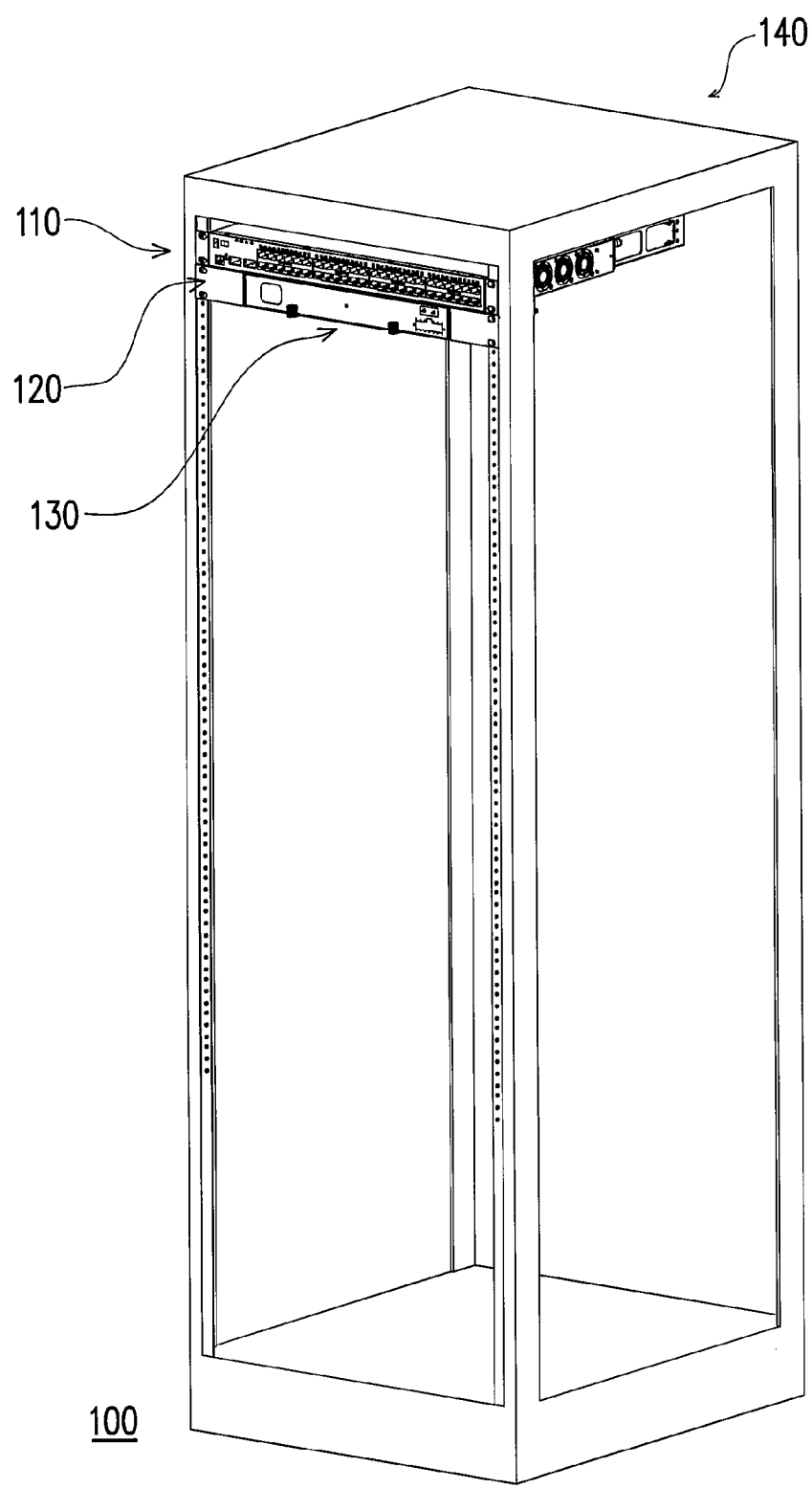
FIG. 2A is a perspective view of an electronic equipment according to a second embodiment of the present invention.
Figure 2B:
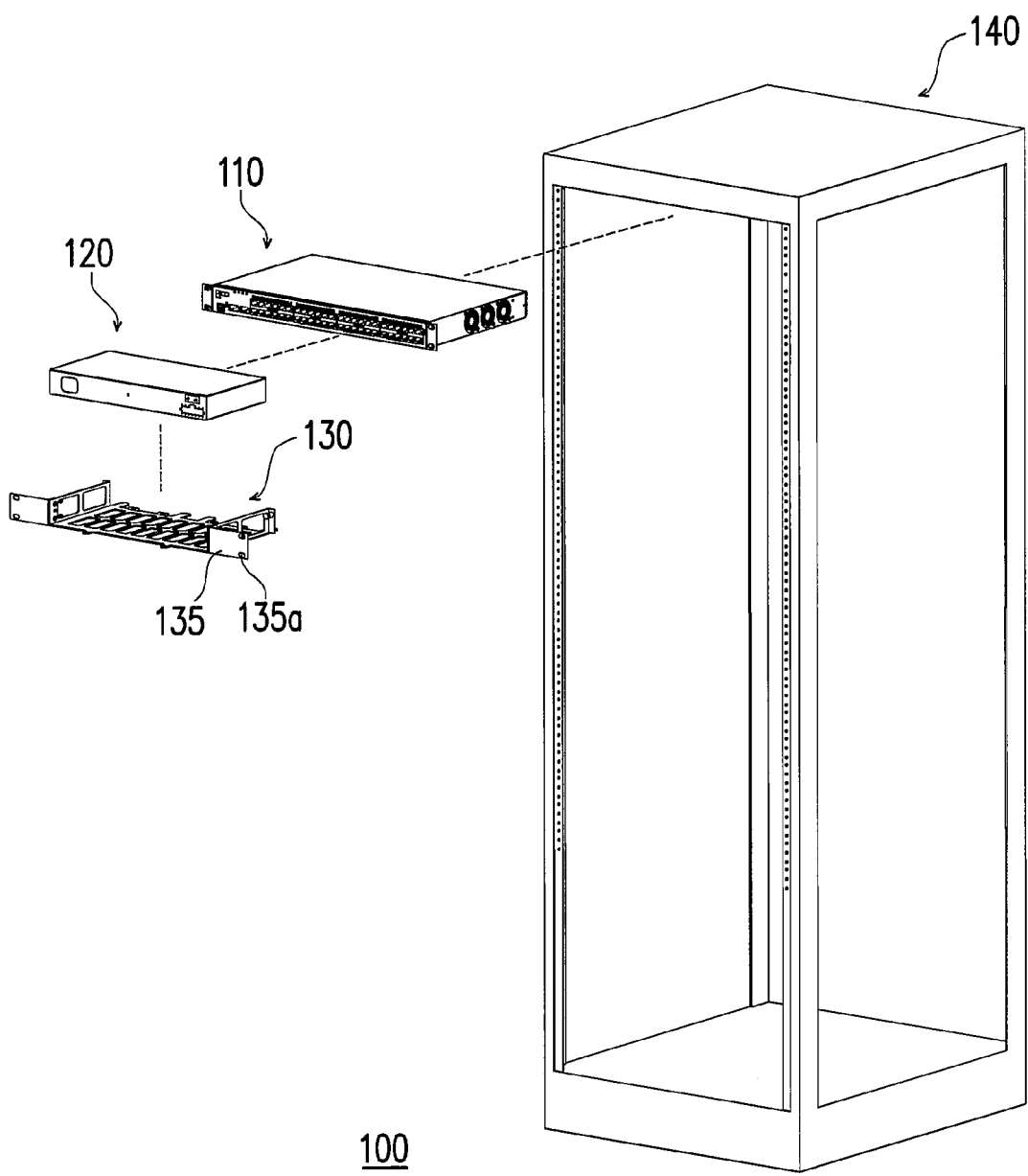
FIG. 2B is a perspective view of the dissociated components of the electronic equipment shown in FIG. 2A.

FIG. 2A is a perspective view of an electronic equipment according to a second embodiment of the present invention. FIG. 2B is a perspective view of the dissociated components of the electronic equipment shown in FIG. 2A. In the following description, components identical to the ones in the first embodiment are labeled identically. Furthermore, a description of the components identical to the first embodiment is not repeated.

As shown in FIGS. 2A and 2B, the electronic equipment 100 in the second embodiment further includes a cabinet 140. The electronic device 110 and the supporting structure 130 can be assembled inside the cabinet 140, and furthermore, they can be assembled on any two of the layers within the cabinet 140. In other words, the location for installing the power supply unit 120 is not limited by the location of the electronic device 110. Therefore, the supporting structure 130 is assembled to the electronic device 110 through the assembling of the supporting structure 130 to the cabinet 140. In addition, the electronic device 110 also overlaps with the power supply unit 120 in the second embodiment.

As mentioned before, the location of the power supply unit 120 is not limited by the location of the electronic device 110. Under this condition, the power supply unit 120 and the electronic device 110 may be electrically connected, for example, through a transmission line (not shown) and a connector corresponding to this transmission line. Obviously, the two units can be flexibly disposed in all kinds of accommodating spaces.

To increase the flexibility of assembling process, the shape of the supporting structure 130 may be slightly modified. In the present embodiment, the supporting structure 130 may further include a pair of assembling portions 135 that can be assembled to the supporting structure 130 or formed as an integral unit to the supporting structure 130. The assembling portions 135 have threaded holes 135a so that screws can be used to lock the supporting structure 130 to the cabinet 140.

In summary, one of the advantages of the electronic equipment in the present invention is that the users not only can replace the power supply unit on their own, but can also replace a variety of the power supply units with different specifications. Moreover, because the power supply unit is physically independent to the electronic device, the volume of the electronic device can be reduced so that more options are available for selecting the position of installation of the electronic device. Besides, the supporting structure can be assembled to the casing of the electronic device, or after a slight modification of the supporting structure, can be assembled to cabinets with different specifications.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic equipment, comprising:
   an electronic device having a casing;
   a power supply unit, physically independent to the electronic device and electrically connected to the electronic device for providing power to the electronic device; and a supporting structure, assembled to the electronic device and used for supporting the power supply unit, wherein the electronic device overlaps with the power supply unit.

2. The electronic equipment of claim 1, further comprising a cabinet such that the electronic device and the supporting structure are assembled inside the cabinet and that the supporting structure is assembled to the electronic device through assembling of the supporting structure to the cabinet.

3. The electronic equipment of claim 1, wherein the power supply unit is detachably assembled to the supporting structure.

4. The electronic equipment of claim 1, wherein the electronic device comprises an Ethernet switch.

5. An electronic equipment comprising:

an electronic device having a casing;

a power supply unit, physically independent to the electronic device and electrically connected to the electronic device for providing power to the electronic device; and a supporting structure, assembled to the electronic device and used for supporting the power supply unit, wherein the electronic device and the power supply unit are arranged in parallel next to each other, at least a first embedded-joint portion and at least a second embedded-joint portion are formed on the casing and the supporting structure respectively, and the first embedded-joint portion and the second embedded-joint portion are engaged to each other so that the casing supports the supporting structure on one side of the casing.

6. The electronic equipment of claim 5, wherein the first embedded-joint portion is a slot and the second embedded-joint portion is a bolt that corresponds to the slot.

7. The electronic equipment of claim 5, wherein the power supply unit is detachably assembled to the supporting structure.

8. The electronic equipment of claim 5, wherein the electronic device comprises an Ethernet switch.

\* \* \* \* \*